JOHN GARMAN.
Saw-Set.

No. 127,758.  Patented June 11, 1872.

Witnesses.  John Garman
Wm Howard  Inventor.
E.W.B. Phillips  by Am Jones
  Atty 127,758

UNITED STATES PATENT OFFICE.

JOHN GARMAN, OF EBENSBURG, PENNSYLVANIA.

IMPROVEMENT IN SAW-SETS.

Specification forming part of Letters Patent No. 127,758, dated June 11, 1872.

I, JOHN GARMAN, of Ebensburg, in the county of Cambria and State of Pennsylvania, have invented a certain new and useful Improvement in Saw-Sets, of which the following is a specification:

My invention relates to a saw-set in which a cam or eccentric is made to impinge upon the saw-tooth, thereby giving it the required set by a gentle pressure. By this means very hard saws may be set without the risk of breaking the teeth, as is often the case when set by a violent blow or stroke, while at the same time it is equally effective in setting saws less highly tempered.

Figure 1:
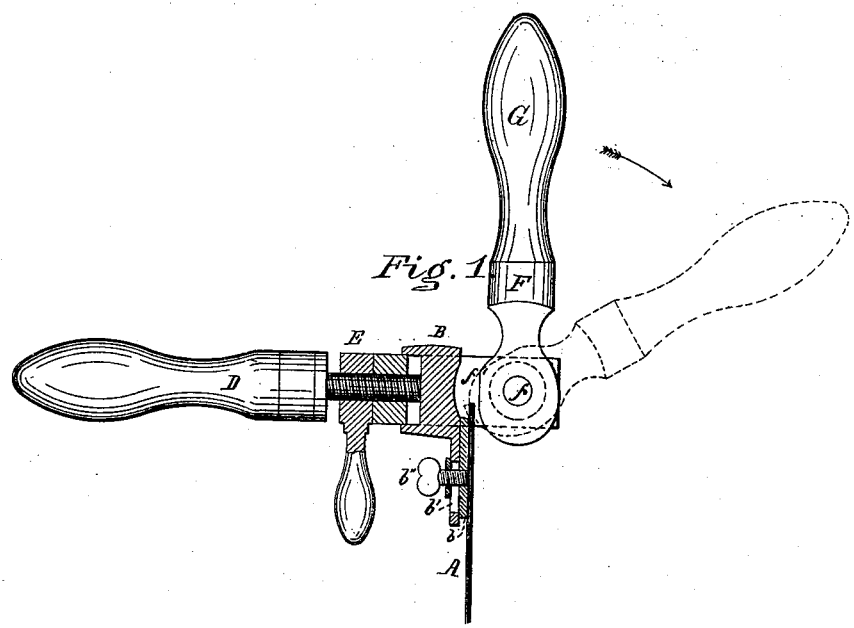
Figure 2:
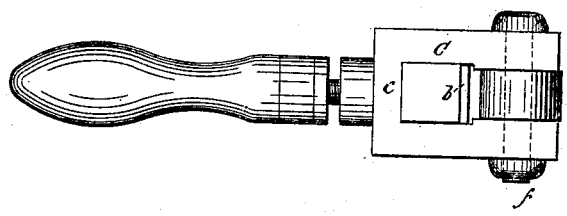

In the accompanying drawing, Figure 1 is a side view, partly in section, of my improved saw-set, and Fig. 2 is a view in the direction of the arrow in Fig. 1.

A represents the saw to be operated upon, and B a table or support for the same. C is a yoke holding the table and cam. D is a screw working into the yoke-head $c$ to regulate the supporting-table B, which is adjustable in the yoke in order to adapt it to various kinds of saws. E is a jam-nut with a handle, and is intended to hold the screw D firmly in position after adjustment. F is a cam, pivoted at $f$ in the yoke, and operated by the handle G. A portion is cut away from the cam, leaving a plain surface, as shown at $f'$, to facilitate the insertion of the saw-tooth under the cam-head. $b$ is a movable plate or gauge, fastened to the table by a screw, $b''$, through a slot, $b'$, in the table B. By moving the sliding gauge-plate the set of the saw can be regulated as desired.

This saw-set is adapted for use on both straight and circular saws.

In operation, the saw-tooth is inserted under the cam-head, and, by a movement of the lever-handle G, the cam is made to impinge on the saw-tooth and give it the required set, as will be clearly perceived by the drawing.

What I claim, and desire to secure by Letters Patent, is—

1. The combination of the lever G, cam F, yoke C, and supporting-table B, substantially as and for the purpose set forth.

2. The supporting-table B, screw D, yoke C, and jam-nut E, combined and arranged substantially as described.

3. The sliding gauge-plate $b$ and supporting-table B, combined and arranged substantially as described.

JOHN GARMAN.

Witnesses:
 R. M. JONES,
 E. PHILLIPS.